Oct. 15, 1957 J. A. VAN DEN BROEK 2,809,553
PICTURE PROJECTOR ASSEMBLY
Filed Jan. 5, 1954 2 Sheets-Sheet 1

INVENTOR
JAN A. VAN DEN BROEK
BY Strauch, Nolan & Diggins
ATTORNEYS

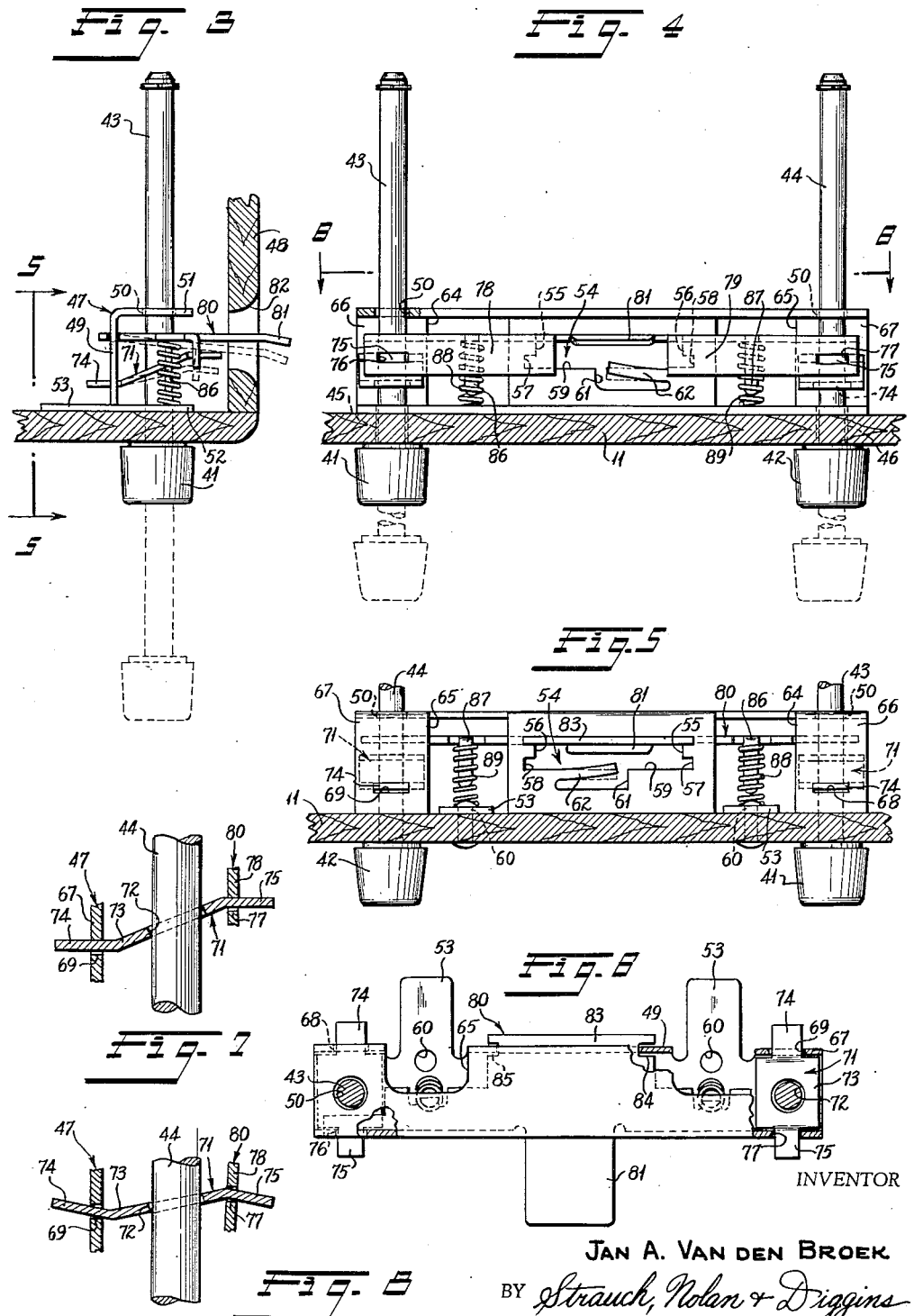

United States Patent Office

2,809,553
Patented Oct. 15, 1957

2,809,553

PICTURE PROJECTOR ASSEMBLY

Jan Abraham Van Den Broek, Ann Arbor, Mich., assignor, by mesne assignments, to Sylvania Electric Products, Inc., New York, N. Y., a corporation of Massachusetts Application January 5, 1954, Serial No. 402,283

9 Claims. (Cl. 88—24)

This invention relates to optical projectors and is particularly concerned with details of such projectors including especially elevator mechanism for attaining the correct angle of tilt of the projector with respect to a screen onto which the picture is to be projected.

In its preferred embodiment the invention will be described as embodied in a portable projector for 35 mm. and like transparencies wherein the support for the projector is provided with a reliable and readily operable elevator mechanism for speedily tilting the projector to the desired angle relative to the screen and maintaining the adjustment.

Various types of elevators have been proposed for still and motion picture projectors, but most of them embody individual screw thread posts at the support corners whereby an element must be turned to slowly raise or lower separately each corner of the projector support, and it is the purpose of the present invention to supplant these prior devices by a balanced adjustment elevator mechanism which is simple in construction and inexpensive but which is easily and quickly operable even in the dark and wherein the weight of the projector itself helps to maintain locked the height adjustment of the elevator.

It is therefore the major object of this invention to provide a picture projector assembly including a novel mechanically simple speedily operated elevator for correctly tilting the projector axis at a desired angle with respect to a screen upon which the picture is to be projected.

A further object of the invention is to provide an elevator for a picture projector wherein spaced adjustment posts depending from the projector support front end are controlled by a novel mechanism that uses the weight of the projector to maintain adjustment.

It is a further object of the invention to provide a novel friction cam locked elevator mechanism in a picture projector assembly.

A further object of the invention is to provide a novel picture projector assembly wherein the projector is adequately cooled by a fan in all positions of tilt of the optical axis.

Further objects of the invention will appear as the description proceeds in connection with the appended claims and the attached drawings wherein:

Figure 3 is an enlarged fragmentary section in side elevation illustrating the elevator mechanism;

Figure 4 is an enlarged front view of the elevator mechanism with support details omitted;

Figure 5 is an enlarged rear elevation of the elevator mechanism substantially on line 5—5 of Figure 3;

Figure 6 is an enlarged top plan view of the elevator mechanism substantially on line 6—6 of Figure 4;

Figures 7 and 8 are fragmentary sections illustrating different operative positions of the lock plate.

Figure 1:
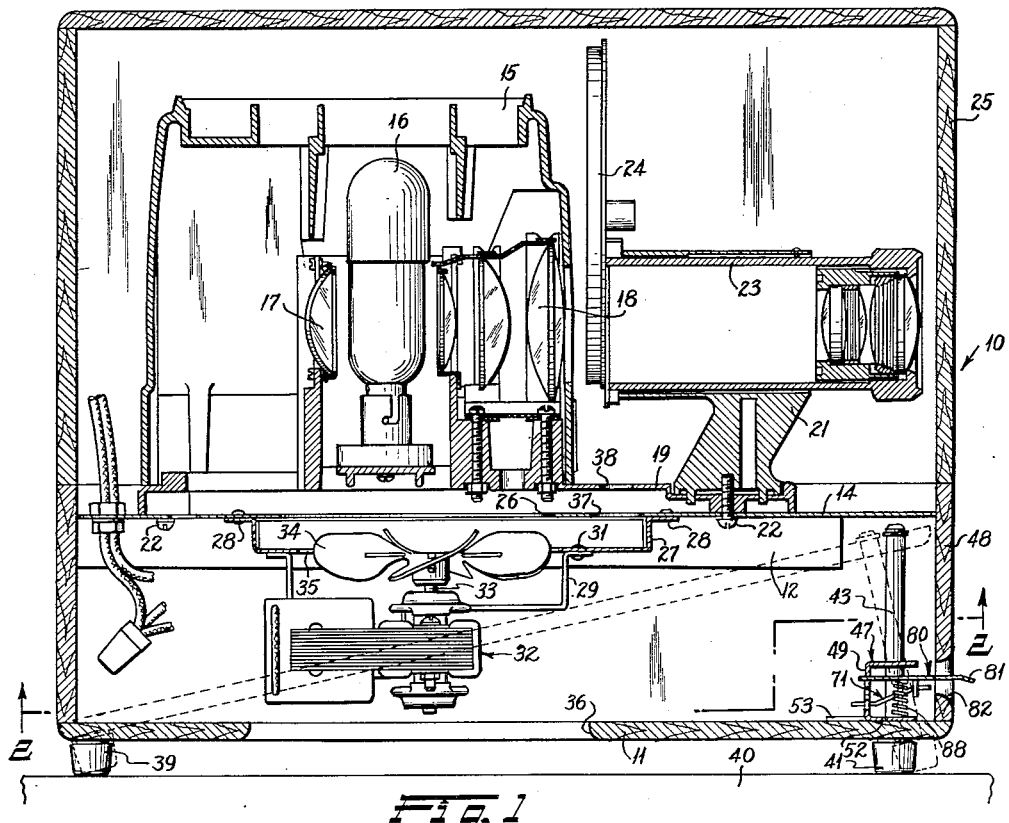
Figure 1 is a vertical section longitudinally of the projector particularly illustrating the optics, the cooling fan and the elevator mechanisms.
Figure 2:
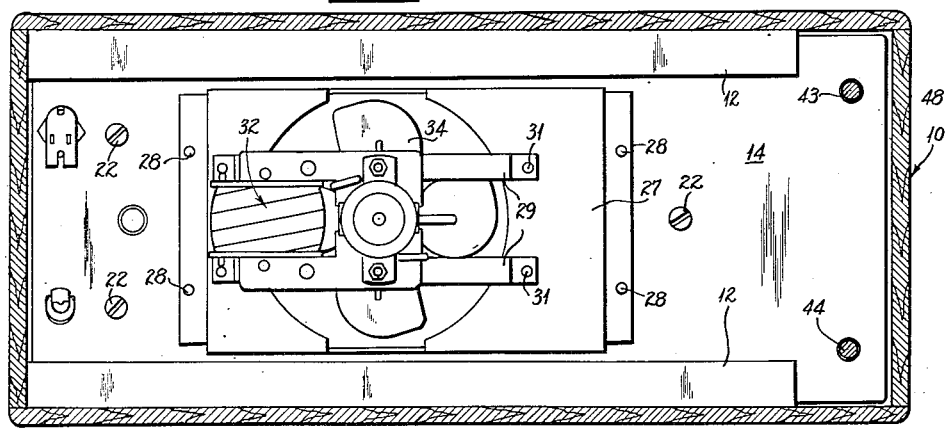
Figure 2 is a bottom section substantially in line 2—2 of Figure 1 illustrating the fan support and the spaced elevator posts.

The projector according to the preferred embodiment of the invention comprises a case 10 which is a rectangular box open at the top and having a flat bottom wall 11 and an internal ledge 12. Secured as by screws 13 on ledge 12 is a flat rigid metal plate 14 which mounts optical members of the projector comprising the lamp housing 15 containing the lamp 16, the reflector 17 and the condenser lens assembly 18. Forwardly of the lamp house, plate 14 has secured thereto an extension of the lamp housing base 19 and a standard 21 is fastened thereon as by screws 22 which extend from the underside of plate 14 so that the front end of the lamp house assembly and the standard 21 are rigidly secured to plate 14. Standard 21 has a bore in which is rotatably and slidably mounted the objective lens tube 23. At the inner end of lens tube 23, the tubular barrel of standard 21 has rotatably mounted thereon a rotary slide changer 24 which is preferably the same as that illustrated in United States Letters Patent No. 2,521,709.

As far as the invention to be claimed herein is concerned all of the lamp and optical members on plate 14 may be more or less conventional, and when the projector is being carried around they are enclosed by a cover 25 which fits over and encloses the opening of the top of box 10 and is secured thereto by suitable buckles (not shown). A suitable handle is preferably provided on the top of cover 25 whereby the whole projector unit may be carried around by the handle.

Plate 14 is provided with an enlarged opening 26 which is in alignment with the open lower end of the lamp house base, and a sheet metal fan shroud 27 is secured to the bottom of plate 14 over opening 26, as by rivets 28. Depending rigidly from the bottom wall of the fan shroud 27 is a bracket 29 that is riveted thereto at 31, and this bracket supports an electric motor assembly 32 upon the vertical shaft 33 of which is a fan blade 34 located within the bottom aperture 35 of the shroud.

When motor 32 is energized, the fan will direct cooling air incoming through aperture 36 in the bottom wall of the casing through the opening 26 and upwardly past the lamp, reflector and condenser lens. Aligned apertures 37 and 38 in the plate 14 and the lamp house base 19 direct cooling air up through the space between the lamp house and slide carrier and this cools the slides.

Referring to the lower right hand corner of Figure 1 and also to enlarged Figure 3, the elevator mechanism is illustrated in full lines in its lowermost position wherein the optical axis of the projector is horizontal when the casing is placed on a level table. At each bottom corner of casing 10 is a button of the same size to rest on the table top 40 and space wall 11 thereabove to open aperture 36 to the air. The two rear support buttons 39 are rigidly secured to the two rear corners of the casing.

The two front support buttons 41 and 42 (Figure 4) are secured respectively to the lower ends of posts 43 and 44 which are loosely slidable vertically in apertures 45 and 46 in bottom wall 11 of the casing 10, so that should the casing be lifted from its table posts 43 and 44 will both tend to slidably drop downwardly due to their own weight. The elevator mechanism of the invention includes guiding and locking mechanism for these posts.

A lock frame 47 which is preferably a unitary element made from a single piece of sheet metal is mounted within the casing on bottom wall 11 as close as possible to the front end vertical wall 48. Frame 47 has a vertical web 49 from which upper and lower flanges 51 and 52 project horizontally toward casing front wall 48. Flange 52 is flush with wall 11 and has two integral rearwardly extending tabs 53 formed of material bent out of web 49 and provided with apertures 60 through which rivets are passed to secure the lock frame 47 rigidly and parallel to walls 11 and 48. Upper flange 51 is formed with openings 50 to permit loose sliding passage of posts 43 and 44, and lower flange 52 is similarly formed.

Vertical web 49 of the lock frame is formed at its middle area with a horizontally elongated opening 54 which is generally rectangular with parallel vertical side edges 55 and 56 but provided at the bottom of each side edge with outwardly extending rectangular outline notches 57 and 58 respectively. At the bottom edge 59 of opening 54 a narrow long vertical slot 61 is formed just below and parallel to edge 59 to provide a tab 62 that may be bent up to the position shown in Figure 5.

Web 49 of the lock frame is interrupted by vertical cut-out portions 64 and 65 that extend partway into upper web 51 as shown in Figure 6, and the outer spaced vertical end sections of web 49 are indicated at 66 and 67 respectively. Near their lower ends web sections 66 and 67 are provided with short horizontal slots 68 and 69.

Lock plates 71 which are identical are formed with circular apertures 72 surrounding and slightly larger than cylindrical posts 43 and 44. As shown in Figures 3, 7 and 8 these lock plates each have an intermediate normally inclined section 73 and a rear generally horizontal lug 74 that extends loosely through web slots 68 and 69. In effect therefore these lock plates are pivotally mounted at their rear ends on the lock frame web.

Forwardly extending lugs 75 of the lock plates project loosely through horizontal slots 76 and 77 formed in the downturned front flanges 78 and 79 respectively of a lock bar 80 that has a manual operating tab 81 projecting through aperture 82 in wall 48.

At its rear end lock bar 80 is formed with a central rectangular tongue 83 having aligned rectangular side notches 84 and 85. The width of tongue 83 is slightly greater than the distance between edges 55 and 56 of the lock frame web, but the distance between the adjacent sides of notches 84 and 85 is approximately equal to the distance between edges 55 and 56, and the parts are so dimensioned that lock bar tongue 83 may be inserted into opening 54 at the lower end of that opening as permitted by notches 57 and 58 and, when the lock bar notches 84 and 85 are aligned with the opening 54, the entire lock bar may slide straight upwardly in opening 54 to the position shown in Figure 3 guided by engagement of the tongue notches 84 and 85 with side edges 57 and 58 of the opening. So positioned the tongue of lock bar 80 is effectively pivoted on web 49 of the lock frame for movement about a generally horizontal axis as will appear. Usually after this assembly operation tab 62 is bent up enough to act as a stop to prevent tongue 83 from becoming depressed far enough to permit accidental disassembly.

Two vertical spur projections 86 and 87 are struck downwardly out of lock bar 80 and they enter the upper ends of vertically disposed coiled compression springs 88 and 89 respectively that have their lower ends seated on lock frame web 52. Springs 88 and 89 are quite powerful and they urge and maintain lock bar 80 in its uppermost Figure 1 position and, viewed in Figure 3, they tend to rock lock bar 80 counterclockwise about that pivot.

This spring force on lock bar 80 also urges lock plates 71 counterclockwise in Figure 1 due to the engagement of lugs 75 with the lock bar, and this normal position of the parts is shown in Figure 7 where the opposite sharp corners of apertures 72 of the tilted spring biased lock plates grip the posts 43 and 44 to prevent sliding of the posts relative to the lock plates.

In operation, starting with the parts as shown in Figures 1 and 4 in full lines, the strong springs 88 and 89 urge lock bar 80 and lock plates 71 counterclockwise (Figure 1) and cam the lock the plates 71 into tight frictional engagement with posts 43 and 44. Under these conditions these posts remain immovable even if the front end or all of case 10 should be lifted from the table top 40. In the Figure 1 position the projector light beam axis is horizontal or parallel to the table top.

Should it be desired to tilt the light beam axis upwardly as to center it on a screen, the operator need only place his thumb on lock bar tab 81 and his other fingers on the bottom of case wall 11 and squeeze to displace tab 81 downwardly. The effect of this is to rock lock bar 80 clockwise in Figure 1, thereby rocking both lock plates 71 downwardly from the position of Figure 7 to that of Figure 8 wherein the edges of cam apertures 72 are tilted to release posts 43 and 44 which are now free to slide vertically with respect to case 10.

As the operator now slowly lifts the front end of case 10, the case rocks on rear buttons 39 and posts 43 and 44 drop by gravity, effectively both maintaining contact with the table top 40 until the desired angle of tilt of the light beam, such as that corresponding to the position shown in dotted lines in Figure 1, is reached. Then the operator simply releases tab 81 and the powerful springs 88 and 89 immediately rock the lock plates 71 to the Figure 7 position to tightly grip the posts 43 and 44 and maintain the adjustment. The operation is smooth and speedy, and the increments of adjustment are infinite.

When it is desired to lower the light beam, or to retract the posts within the case for portability, etc., the operator grasps the tab 81 and the case as before and slowly lowers the case back to the Figure 1 position.

Since the above described locking mechanism is horizontal, and the posts 43 and 44 are vertically slide guided, both posts move the same amount with each adjustment and there is no unbalance from side to side or, if such should occur, it can be instantaneously corrected.

The details of the disclosed construction have been found to be practical and satisfactory for inexpensive and ready assembly. It will be appreciated, however, that the lock frame or its equivalent may be built into the case as a part thereof, and/or that the lock bar could be rockably mounted on the case, as on the front wall, and function equivalently well. The primary purpose of the buttons 39, 41 and 42 is to provide resilient feet that will not scratch the furniture supporting the device. It is not essential to the scope of the invention that the enlargement provided by buttons 41 and 42 serve also to limit upward displacement of the posts, although such is preferable, since the same function could be obtained by another enlargement on each post above the buttons or by engagement of the post upper ends with plate 14.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a picture projector, a support carrying a lamp house and associated projection lenses, said support having a bottom wall and a front end wall, spaced elevator posts loosely slidably mounted to project substantially vertically through said bottom wall and terminating in platform engaging feet below said bottom wall, mechanism for peripherally gripping both of said posts mounted on said support above said bottom wall, and release means for said mechanism comprising a manually operable trigger projecting through said front wall.

2. Elevator mechanism for a picture projector and like tiltable article support comprising a lock frame on said support, spaced posts loosely slidable vertically through said frame, lock plates apertured to pass said posts and shiftably mounted on said lock frame, a lock bar rockably mounted on said lock frame and operatively connected to said lock plates, resilient means biasing said lock bar in a predetermined direction and toward a position where said lock plates are shifted into friction lock with said posts, and manual operating means for shifting said lock bar against the force of said resilient means to release the grip of said posts by said lock plates and permit said posts to slide through said frame to a position of adjustment corresponding to a desired tilt of said support, said resilient means when said manual operating means is released acting through said lock bar to shift said lock plates back into friction lock with said posts whereby the position of adjustment of said support is maintained.

3. In the mechanism defined in claim 2, said posts being mounted in spaced relation near one edge of said support for adjustably tilting it about the opposite edge.

4. In an elevator adjustment for a picture projector or the like, a lock frame, spaced posts vertically slidable through said lock frame, lock plates pivoted on said lock frame and having apertures through which said posts pass, said apertures being slightly larger than the said posts, a lock bar rockably mounted on said lock frame and operatively connected to both lock plates, resilient means normally biasing said lock bar to tilt said lock plates to frictionally grip said posts at said apertures, and means for rocking said lock bar against the force of said springs for temporarily tilting said lock plates to align their apertures with said posts and thereby release said friction lock to permit sliding of said posts through said lock frame to an adjusted position.

5. In an elevator mechanism for a picture projector wherein the optical system and lamp of the projector are mounted upon a box-like case, spaced vertical elevator posts loosely slidable through the case at the front corners thereof whereby when the front of the case is lifted away from a supporting platform the posts will through gravity tend to remain in contact with said platform, and positive peripheral gripping means within said case normally spring biased to lock said posts to said case but having means accessible through a wall of said case for temporarily unlocking said gripping means to permit relative adjustment of said posts and case to a desired position of tilt for said projector.

6. In a picture projector assembly wherein a lamp and projection lenses are optically aligned and mounted on a common support, the combination of spaced posts loosely slidable vertically through said support, lock plates apertured to pass said posts and shiftably mounted on said support, a lock bar rockably mounted on said support and operatively connected to said lock plates, resilient means biasing said lock bar in a predetermined direction and toward a position where said lock plates are shifted into friction lock with said posts, and manual operating means for shifting said lock bar against the force of said resilient means to release the grip of said posts by said lock plates and permit said posts to slide through said support to a position of adjustment corresponding to a desired tilt of said support for effecting a desired orientation of the axis of projection, said resilient means when said manual operating means is released acting through said lock bar to shift said lock plates back into friction lock with said posts whereby the position of adjustment of said support is maintained.

7. In a tiltable elevator adjustment for a picture projector wherein the optical elements are mounted on a box-like support, laterally spaced generally vertical posts disposed near the opposite front corners of said support and adapted to rest on a platform, means on said support relatively freely guiding said posts for relative vertical displacement with said support for releasably gripping said posts in any position of such vertical displacement comprising normally tilted apertured members one for each post resiliently urged to grip the peripheries of said posts and means for simultaneously tilting both of said apertured members for temporarily releasing said post gripping means to freely permit such adjustment.

8. In an elevator mechanism for a picture projector wherein the lamp, condenser lens and objective lens of the projector are mounted in alignment upon a box-like base, a projector axis tilt selector assembly chiefly within the front end of said base, said assembly comprising an inclined spring biased apertured lock plate pivoted about a transverse axis and having an operator by which it is accessible for manual manipulation through an opening in the front of said base, and an elevator post having a shank extending vertically through said aperture in the plate and a foot portion adapted to rest on a table and like support, said plate being normally urged toward inclined locking position whereby opposite edges of its aperture engage the post shank at vertically spaced points in tight clamping relation, and said post being freed for vertical displacement when said plate is manually pivoted toward the horizontal so that said base may be tilted to a desired projection angle with its rear side on the support and the elevation of its front side determined by the vertical position of the post.

9. In a picture projector assembly, a support, optically aligned lamp and lens means mounted on said support so as to define a projection axis, means for controllably tilting and maintaining tilt of said support to select orientation of the projection axis comprising at least one forwardly disposed post loosely and vertically displaceably mounted on said support, locking means for said post comprising an inclined plate having a hole through which the post passes larger than the associated post periphery and normally resiliently biased to an inclined position where its edges peripherally grip said post, and manually operated actuating means shiftably mounted on said support adapted when moved in one direction to tilt said plate toward a position normal to the post axis and thereby unlock the post for free relative displacement with respect to said support, said plate being resiliently returned to post gripping position when said actuating means is released to thereby maintain the adjustment.

References Cited in the file of this patent
UNITED STATES PATENTS

| | | |
|---|---|---|
| 388,195 | Hammond et al. | Aug. 21, 1888 |
| 389,577 | Kintz | Sept. 18, 1888 |
| 406,107 | Maschmeyer | July 2, 1889 |
| 709,612 | Smith | Sept. 23, 1902 |
| 1,549,374 | Nolan | Aug. 11, 1925 |
| 1,925,149 | McCandless | Sept. 5, 1933 |
| 1,964,446 | Wood et al. | June 26, 1934 |
| 2,221,920 | Kurtz et al. | Nov. 19, 1940 |
| 2,281,988 | Osterberg et al. | May 5, 1942 |
| 2,560,150 | Bateman | July 10, 1951 |
| 2,598,573 | Lutes | May 27, 1952 |